(12) United States Patent
Smith

(10) Patent No.: US 6,922,025 B2
(45) Date of Patent: Jul. 26, 2005

(54) ZERO RIPPLE LINEAR MOTOR SYSTEM

(75) Inventor: James F. Smith, Smithtown, NY (US)

(73) Assignee: Anorad Corporation, Shirley, NY (US)

( * ) Notice: Subject to any disclaimer, the term of this patent is extended or adjusted under 35 U.S.C. 154(b) by 0 days.

(21) Appl. No.: 10/368,850

(22) Filed: Feb. 19, 2003

(65) Prior Publication Data

US 2003/0227268 A1 Dec. 11, 2003

Related U.S. Application Data

(60) Provisional application No. 60/358,650, filed on Feb. 21, 2002.

(51) Int. Cl.[7] .............................. H02P 5/28; H02P 7/36
(52) U.S. Cl. ............. 318/135; 318/568.13; 318/568.15; 318/568.22; 318/639
(58) Field of Search .......................... 318/135, 568.13, 318/568.14, 568.15, 568.22, 638, 639, 798, 806

(56) References Cited

U.S. PATENT DOCUMENTS

| | | | | |
|---|---|---|---|---|
| 5,208,497 A | * | 5/1993 | Ishii et al. ..................... 310/12 |
| 5,550,685 A | * | 8/1996 | Drouin ..................... 360/77.08 |
| 5,684,374 A | * | 11/1997 | Chaffee ..................... 318/616 |
| 5,757,149 A | * | 5/1998 | Sato et al. ................... 318/135 |
| 6,025,691 A | * | 2/2000 | Kawabata et al. ........... 318/700 |
| 6,326,750 B1 | * | 12/2001 | Marcinkiewicz ............ 318/432 |
| 6,355,994 B1 | * | 3/2002 | Andeen et al. ................ 310/15 |
| 6,384,995 B1 | * | 5/2002 | Smith .......................... 360/31 |
| 6,448,723 B1 | * | 9/2002 | Wakui ......................... 318/135 |
| 6,472,842 B1 | * | 10/2002 | Ehsani ........................ 318/701 |
| 6,614,613 B1 | * | 9/2003 | Huang et al. .................. 360/75 |

* cited by examiner

Primary Examiner—Thanh Lam
Assistant Examiner—Judson H. Jones
(74) Attorney, Agent, or Firm—Amin & Turocy LLP; Alexander R. Kuszewski

(57) ABSTRACT

The present invention relates systems and methods for compensating for errors associated with a linear motion system. The systems and methods determines one or more errors associated with the linear motion system and adjusts or corrects an input drive signal associated with the linear motion system to compensate for the one or more errors. The one or more errors of the linear motion system can include cogging errors and ripple errors. The one or more errors can be measured using a measurement system or the one or more errors can be associated with selectable coefficients or parameters, such as standard errors, or device type errors stored in a library.

31 Claims, 9 Drawing Sheets

ZERO RIPPLE LINEAR MOTOR SYSTEM

REFERENCE TO RELATED APPLICATION

This application claims the benefit of U.S. Provisional Patent Application Ser. No. 60/358,650, which was filed Feb. 21, 2002, entitled ZERO RIPPLE LINEAR MOTOR SYSTEM, which is incorporated by reference herein.

TECHNICAL FIELD

The present invention generally relates to linear motion systems and in particular to a system and method for compensating for errors in linear motion systems.

BACKGROUND OF THE INVENTION

There are various configurations of linear motors, including generally flat motors, U-channel and tubular shaped motors. Different types of linear motors also are available, including brush, AC brushless, stepper, and induction motors. Common to most linear motors are a moving assembly, usually called a forcer, which moves relative to a stationary platen according to magnetic fields generated by application of current through one or more associated windings. The windings can be on the forcer or at the platen depending on the type of motor. For example, in a permanent magnet linear motor, a series of armature windings are mounted within a stage that is movable relative a stationary base plate or platen. The platen typically includes an array of permanent magnets configured to interact with the coils in the stage when energized with an excitation current. Alternatively, the magnets can be located in the stage with the coils situated in the platen. A closed loop servo positioning system is employed to control current through the windings. For example, current is commutated through coils of the stage with a three phase sinusoidal or trapezoidal signal in a closed loop feedback system. When such a linear motor is used in a positioning system, the relationship between the location of the stage and locations of the coils is utilized to control its operation.

Linear motors are increasingly being employed in manufacturing equipment. In such equipment, nominal increases in the speed of operation translate into significant savings in the cost of production. However, the cost of such equipment often plays a decisive role in determining which type of system will be employed. Linear motors are used in various types of systems, such as for positioning and moving items, including machining and gantry type systems. The systems often require moving items at high acceleration levels. In order to achieve such high acceleration, the linear motor must exert large forces upon the items to be moved.

Most linear motors are manufactured to follow a straight path and to be of a predetermined fixed length. This establishes the length of the armature, and consequently the number of armature windings. Linear motors do not produce an equal amount of torque at any singular position. For example, a one meter motor can have varying torque at any particular position. Variations in the linear motor or system employing the linear motor cause significant errors or significant difficulties in servo positioning using servo systems to position accurately or to control velocity very smoothly. These disturbances or errors manifest themselves in the servo system, which uses the motor as a device for putting out a constant force independent of position. If the force provided is too low due to errors associated with the linear motion system, the system is not able to hold position or control velocity of the linear motor.

Cogging and ripple errors provide many of the problems associated with varying torque in the motor and/or system. Cogging is associated with the change in reluctance and magnetic field strength at a given position. Ripple is associated with the back EMF of the motor produced by interaction of coils and magnets. Ultimately, the input signals have known wave shapes and provide a uniform force at any position. However, cogging and ripple errors in addition to many other effects cause distortion of the input signal. Other effects are associated with imperfections in mechanical windings, mechanical alignment errors, magnetic fields and mismatches with input signals. All of these errors show up as harmonic distortions of the back EMF waveform.

SUMMARY OF THE INVENTION

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

The present invention relates to systems and methods for compensating for errors associated with a linear motion system. The systems and methods determine one or more errors associated with the linear motion system (e.g., linear motor, controller, amplifier, track, travel path, device interaction, etc.), map the errors into one or more adjustments parameters and use the one or more adjustment parameters to adjust one or more input drive signals associated with the linear motion system. The one or more errors of the linear motion system can include cogging errors and ripple errors. The one or more errors can be measured using a measurement system (e.g., in real-time) or the one or more errors can be associated with selectable parameters, such as standard errors, or device type errors (e.g., from an error library).

The following description and the annexed drawings set forth in detail certain illustrative aspects of the invention. These aspects are indicative, however, of but a few of the various ways in which the principles of the invention may be employed. Other advantages and novel features of the invention will become apparent from the following detailed description of the invention when considered in conjunction with the drawings.

DETAILED DESCRIPTION OF THE INVENTION

The present invention will be described with reference to systems and methods for compensating for errors associated with a linear motion system. The systems and methods determines one or more errors associated with the linear motion system and adjusts or corrects an input drive signal associated with the linear motion system to compensate for the one or more errors. The one or more errors of the linear motion system can include cogging errors and ripple errors. Cogging errors are a form of magnetic detenting that occurs when a coil's steel laminations cross the alternating poles of the motor's rare-earth magnets. Cogging is typically negligible in non-ferrous motors, however, cogging in steel core motors is typically about 5% of the motor's continuous force rating. Ripple relates to all of the other errors associated with a linear motion system that cause a back EMF effect on the input drive signal. The one or more errors can be measured using a measurement system or the one or more errors can be associated with selectable coefficients or parameters, such as standard errors, or device type errors (e.g., from an error library).

Figure 1:
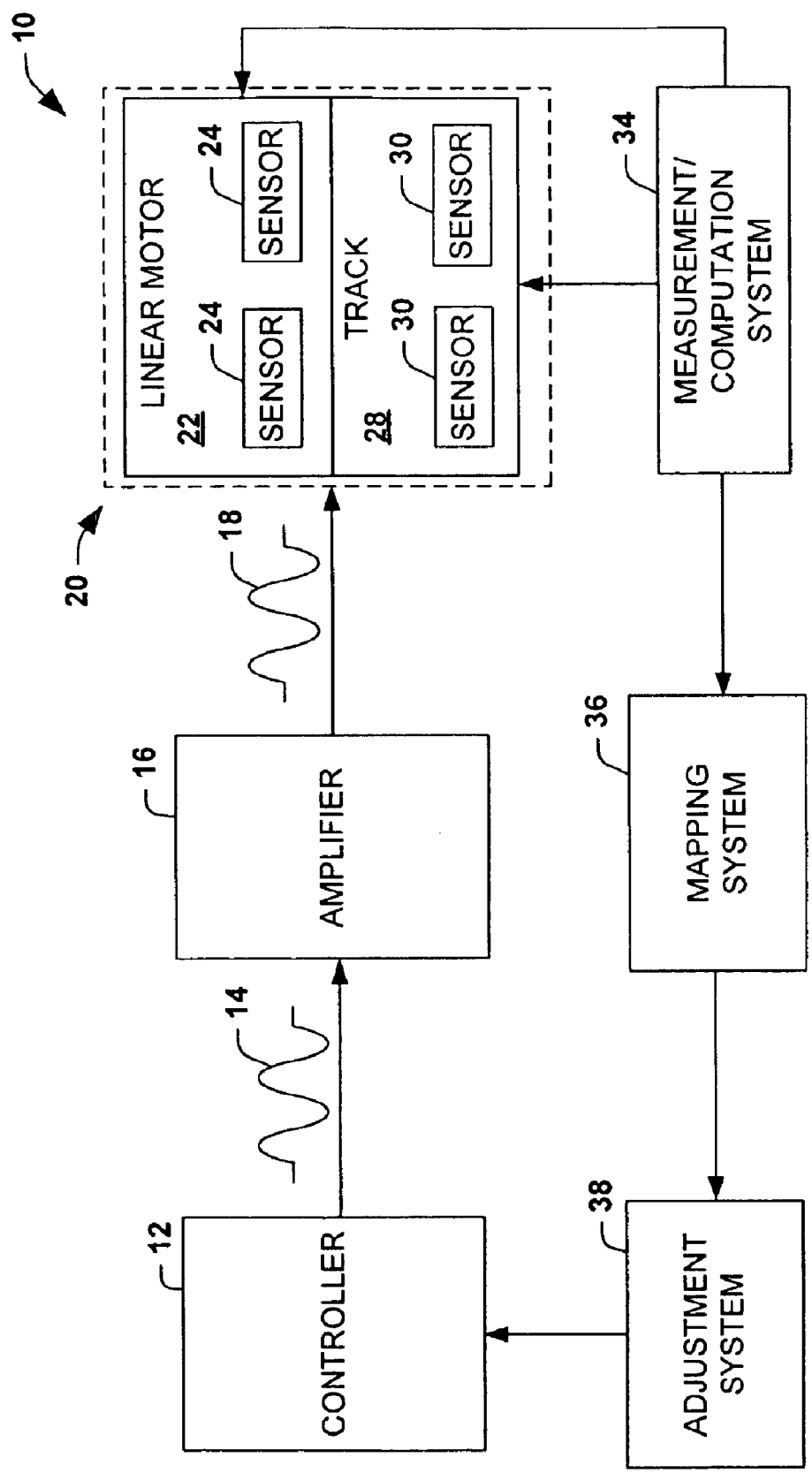
FIG. 1 illustrates a block schematic diagram of a linear motion system in accordance with an aspect of the present invention.

FIG. 1 illustrates a linear motion system 10 in accordance with an aspect of the present invention. The linear motion system 10 includes a controller 12 coupled to an amplifier 16. The controller 12 and the amplifier 16 cooperate to control and drive a linear motor 22 along a track 28 in the linear motion system 10. The controller 12 provides a drive signal 14 to the amplifier 16, which amplifies the drive signal 18 and provides an amplified drive signal 18 to the linear motion system 20. The drive signal 18 controls the movement of the linear motor 22 along the track 28 for precise positioning of the linear motor 22 at controlled positions along the track 28. Although the input signal is illustrated as a drive signal, it is to be appreciated that the input signal can be a command signal, control signal and/or drive signal.

In one type of linear motion system, the track 28 or the motor 22 includes sets of winding, such as repeating phases of a multiphase armature. The windings are operative to receive corresponding phases of drive power produced by the controller or amplifier. The linear motor includes a plurality of motor magnets arranged, for example, in a generally linear array in a direction of travel. The magnets further are arranged so that adjacent magnets have alternating polarity so as to interact with the magnetic field generated by the windings, which can produce translational forces that effect desired relative movement between the linear motor and the track. It is to be understood and appreciated that, alternatively, the windings could be implemented at the linear motor and the magnets could be arranged in the direction of travel along the track.

The present invention relates to providing compensation for problems relating to position and velocity due to errors such as cogging and ripple. Cogging relates to the change in reluctance and magnetic field strength at a given position, while ripple relates to the back EMF produced by the motor by interaction of coils and magnets in addition to other errors associated with the linear motion system 10. For example, if the input signal 14 is a sinusoid (e.g. 3-phase sinusoid), the ideal output of the amplifier 16 would be an amplified sinunoid that matches the input signal 14 and provides a drive signal to the linear motion system 10 that results in a force that is uniform relative to a position of the linear motor at any location on the track 28. However, several errors cause variations of the force or torque at the linear motor 22 at different locations along the track 28. The effects of these errors have been dormant in the past but have become increasingly critical due to the newer nanometer positioning required of recent linear motion systems. The results are that the sine wave or input signal is not pure due to many errors causing harmonic contents in the input signal(s).

For example, some of the errors include magnetic variations (cogging), magnet and winding manufacturing variations (errors and tolerances), impure input or control signal, impure amplifier signal, mismatch between the input signal and amplifier signal, imperfect magnet orientation, undercurrent conditions (magnorestriction effects, saturation, nonlinear behavior) and undervoltage (capacitance effects). Additionally, inductance changes due to temperature effects, magnetic field changes, mechanical tolerance changes due to differential expansion. Other errors for iron motor types include hysteresis and eddy losses which are dependent on parameters such as temperature current and frequency. Harmonic distortion by definition is the back error EMF caused to the input signal by one or more errors associated with the linear motion system.

The linear motion system 10 measures one or more values and computes the errors associated with the linear motion system, maps these errors into parameters, and utilizes these parameters to correct for harmonic distortion (e.g., first, second, third) in the input signal. The linear motion system 10 substantially eliminates the harmonic distortion by inversely correcting the input signal based on the measured and mapped out errors. The linear motion system errors can be of a single occurrence type (e.g., one location along a given path) and of a repeating type (e.g., every time a linear motor passes over a magnet or coil).

A plurality of sensors 24 are associated with the linear motor 22 and a plurality of sensors 30 are associated with the track 28. A measurement system 34 is electrically coupled to the sensors 24 and 30. The sensors 24 and 30 measures errors (e.g., cogging errors, ripple errors) relating to the linear motor 22 and track 28, and provide the measurement system 34 with electrical signals indicative of measurements associated with the linear motor 22 and the track 28. The measurement system 34 can be employed to collects the measured signals, amplifies the signals and provides the signals to a mapping system 36. The mapping system 36 collects all of the signals from the measurement system 34 and associates parameters with the errors. The parameters can then be mapped or aggregated into a single error parameter (e.g., equation) and provided to a correction system 38. The correction system 38 utilizes the aggregated error parameter to determine a correction factor (e.g., correction signal or instruction). The correction factor is then provided to the controller 12, which employs the correction factor to adjust the input signal 14 to correct or inversely compensate for harmonics associated or induced into the drive input signal 18 due to the one or more errors of the linear motion system 10.

Figure 2:
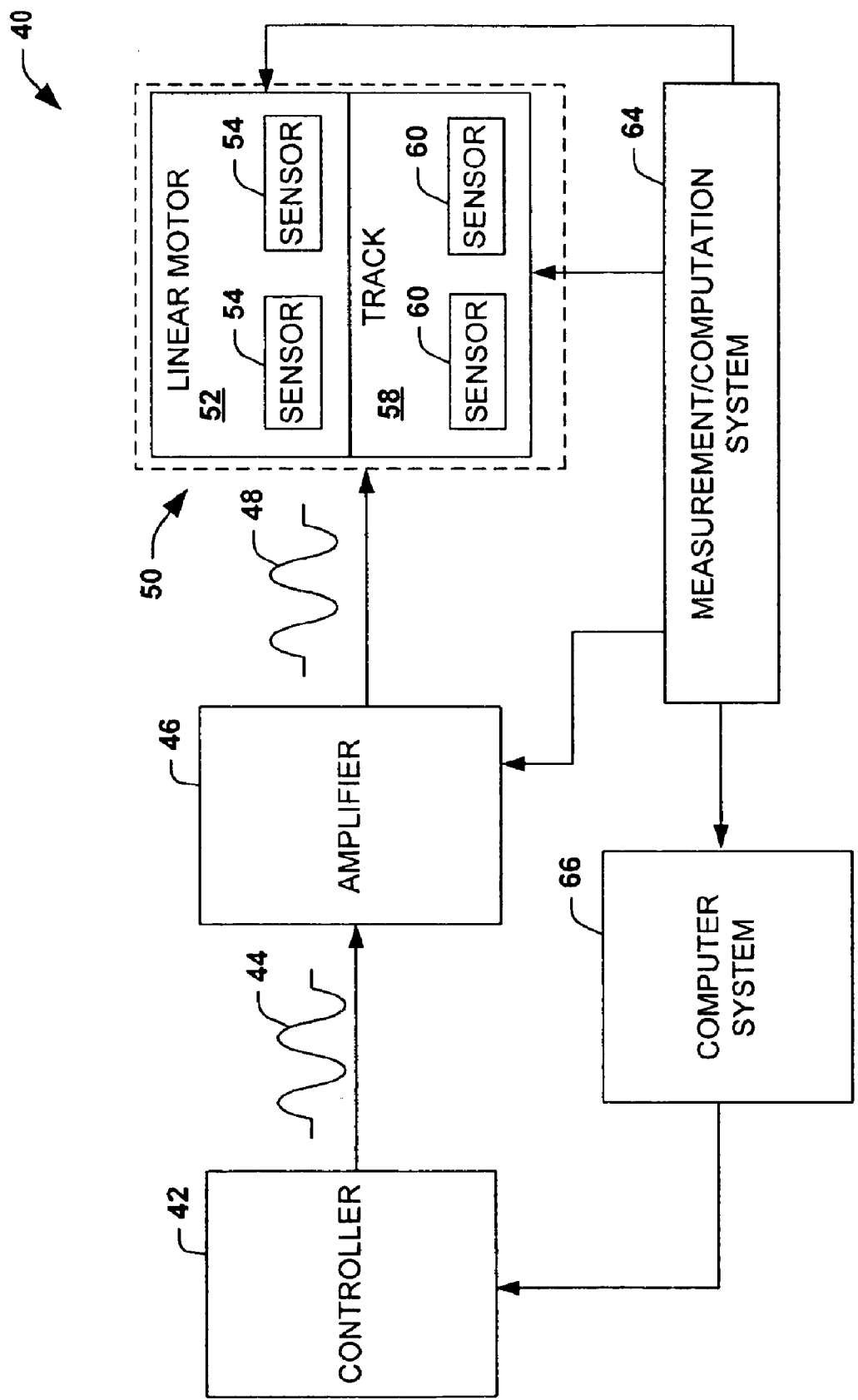
FIG. 2 illustrates a block schematic diagram of a linear motion system utilizing a computer system for error corrections in accordance with an aspect of the present invention.

FIG. 2 illustrates a linear motion system 40 wherein the functionality of the mapping system and the correction adjustment system are incorporated into an algorithm residing on a computer in accordance with an aspect of the present invention. The linear motion system 40 includes a controller 42 coupled to an amplifier 46. The controller 42 and the amplifier 46 cooperate to control and drive a linear motor 52 along a track 58 in a linear motion system 50. The controller 42 provides a drive signal 44 to the amplifier 46, which amplifies the drive signal 48 and provides an amplified drive signal 48 to the linear motion system 50. The drive signal 48 controls the movement of the linear motor 42 along the track 48 for precise positioning of the linear motor at controlled positions along the track 58. Although the input signal is illustrated as a drive signal, it is to be appreciated that the input signal can be a command signal, control signal and/or drive signal.

The linear motion system 40 measures one or more errors associated with the linear motion system 40, maps these errors into parameters, and utilizes these parameters to correct for harmonic distortion (e.g., 1st, 2nd, 3rd) in the input signal 42 and/or 48. The linear motion system 40 substantially eliminates the harmonic distortion by inversely correcting the input signal based on the measured and mapped out errors. A plurality of sensors 54 are associated with the linear motor 52 and a plurality of sensors 60 are associated with the track 58. A measurement system 64 is electrically coupled to the sensors 54 and 60. The sensors 54 and 60 measures errors (e.g., cogging errors, ripple errors) relating to the linear motor 52 and track 58 and provide the measurement system with electrical signals indicative of measurements associated with the linear motor 52 and the track 58. The measurement system also collects one or more errors from the amplifier 46 (e.g., mismatch of inputs signals 44 and 48). The measurement system 64 collects the measured signals, amplifies the signals and provides the signals to a computer system 66.

The computer system 66 includes a correction algorithm for collecting all of the signals from the measurement system and associating parameters with the measured errors. The correction algorithm then maps or aggregates the errors into a single error parameter (e.g., equation). The correction algorithm utilizes the aggregated error parameter to determine a correction factor (e.g., correction signal or correction instruction). The correction signal or instruction is then provided to the controller 42 and/or amplifier 46, which employs the correction signal (e.g., using a mixer) or instruction to adjust the input signal 44 and/or 48 to correct or inversely compensate for harmonics (e.g., first, second, third) associated or induced into the drive input signal 48 due to the one or more errors of the linear motion system 40.

Figure 3:
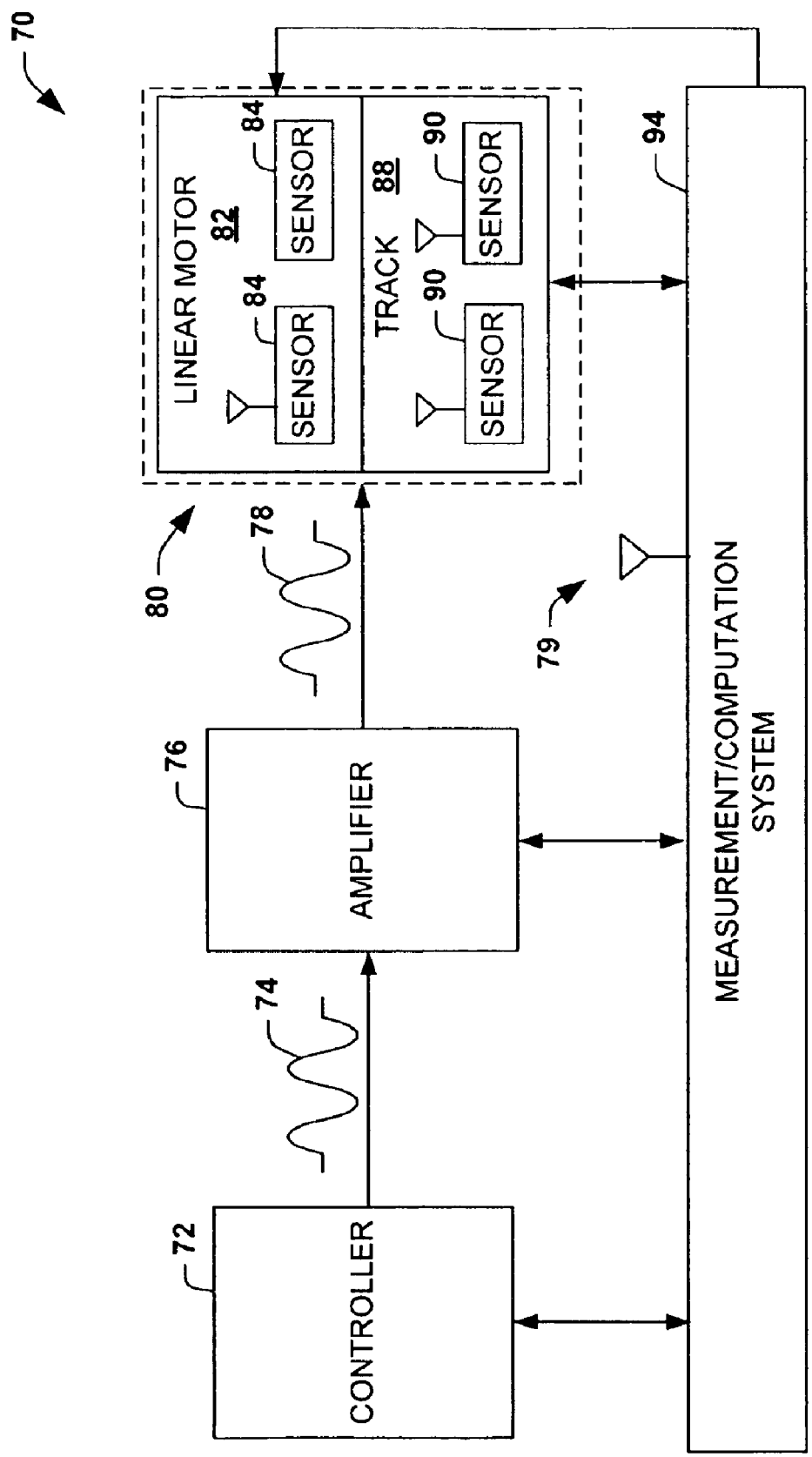
FIG. 3 illustrates a block schematic diagram of a linear motion system in accordance with another aspect of the present invention.

FIG. 3 illustrates a linear motion system 70 wherein the functionality of the mapping system and the correction adjustment system are incorporated into a controller 72 in accordance with an aspect of the present invention. The linear motion system 70 includes a controller 72 coupled to an amplifier 76. The controller 72 and the amplifier 76 cooperate to control and drive a linear motor 82 along a track 88 in a linear motion system 80. The controller 82 provides a drive signal 74 to the amplifier 76, which amplifies the drive signal 76 and provides an amplified drive signal 78 to the linear motion system 70. The drive signal 78 controls the movement of the linear motor 82 along the track 88 for precise positioning of the linear motor at controlled positions along the track 88.

The linear motion system 70 measures one or more errors associated with the linear motion system 70, maps these errors into parameters, and utilizes these parameters to correct for harmonic distortion (e.g., 1st, 2nd, 3rd) in the input signal 74 and/or 78. The linear motion system 70 substantially eliminates the harmonic distortion by inversely correcting the input signal based on the measured and mapped out errors. A plurality of sensors 84 are associated with the linear motor 82 and a plurality of sensors 90 are associated with the track 88. A measurement system 94 includes an antenna 79 for receiving transmitted signals wirelessly from the sensors 84 and 90 corresponding to errors (e.g., cogging errors, ripple errors) associated with the linear motor 82 and the track 88. The measurement system also collects one or more errors from the amplifier 76 (e.g., mismatch of inputs signals 74 and 78). The measurement system 94 collects the measured signals, amplifies the signals and provides the signals to the controller 72.

The controller 72 includes a correction algorithm for collecting all of the signals from the measurement system 94 and associating parameters with the measured errors. The correction algorithm then maps or aggregates the errors into a single error parameter (e.g., equation). The correction algorithm utilizes the aggregated error parameter to determine a correction signal or instruction. The correction algorithm or instruction adjusts the input signal 74 and/or 78 to correct or inversely compensate for harmonics (e.g., first, second, third) associated or induced into the drive input signal 78 due to the one or more errors of the linear motion system 70.

The present invention can also employ technologies associated with facilitating inference and decision making under uncertainty and optimization of expected utility and/or minimization of expected costs. Thus, statistical inference may be performed with models constructed by hand, from data with machine learning methods, or by a mixture of machine learning and human assessment. Such models can be used in conjunction with deterministic policies where depending on the context, an inferential rule or deterministic rule is used.

A variety of machine learning systems/methodologies (e.g., Bayesian learning methods that perform search over alternative dependency structures and apply a score (such as the Bayesian Information Criteria, etc.) methods, Bayesian classifiers and other statistical classifiers, including decision tree learning methods, support vector machines, linear and non-linear regression, expert systems and neural network representations, etc.) may be employed to build and update inferential models.

Figure 4:
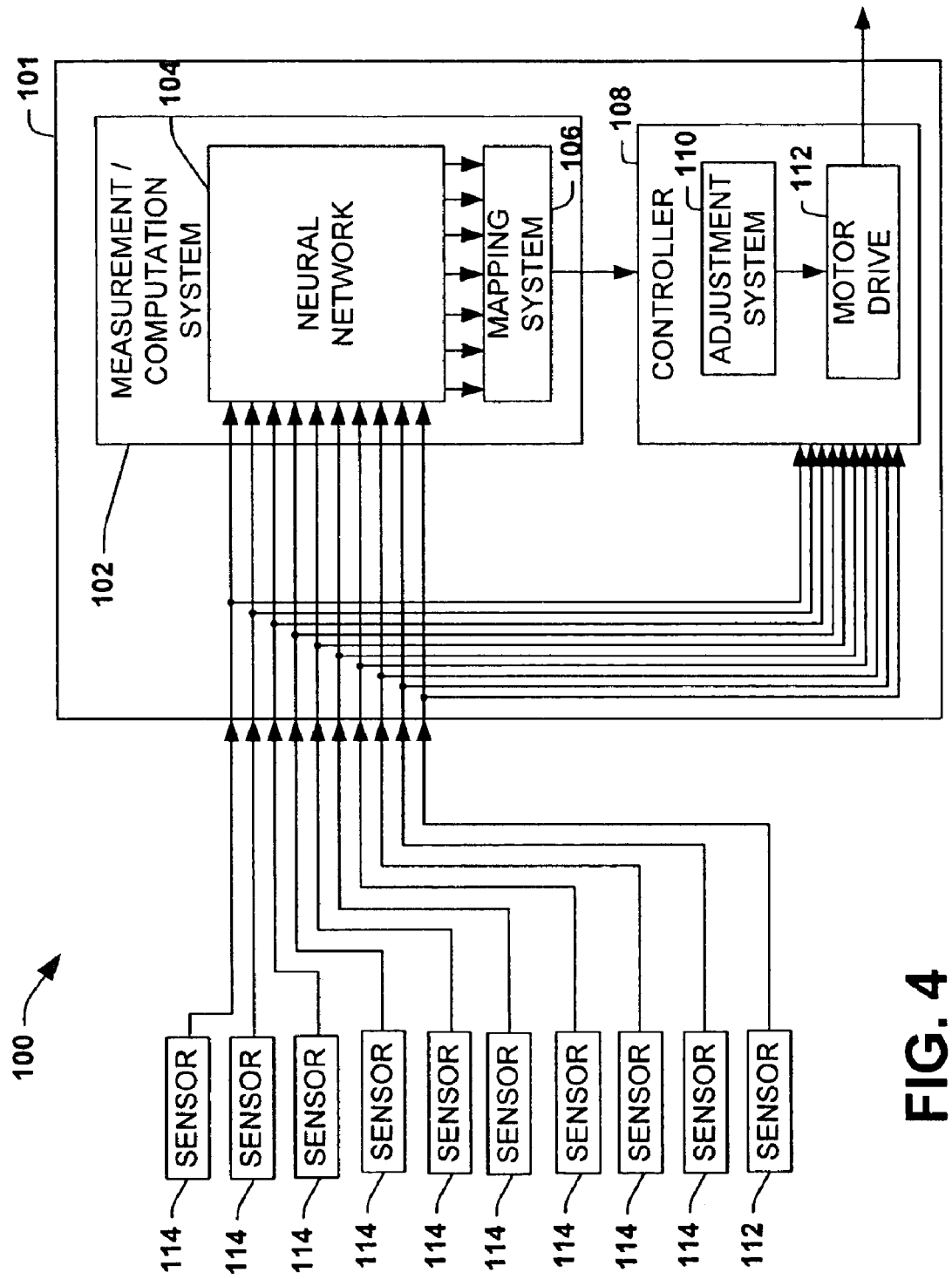
FIG. 4 illustrates a block schematic diagram of an error compensation system employing a neural network in accordance with an aspect of the present invention.
Figure 5:
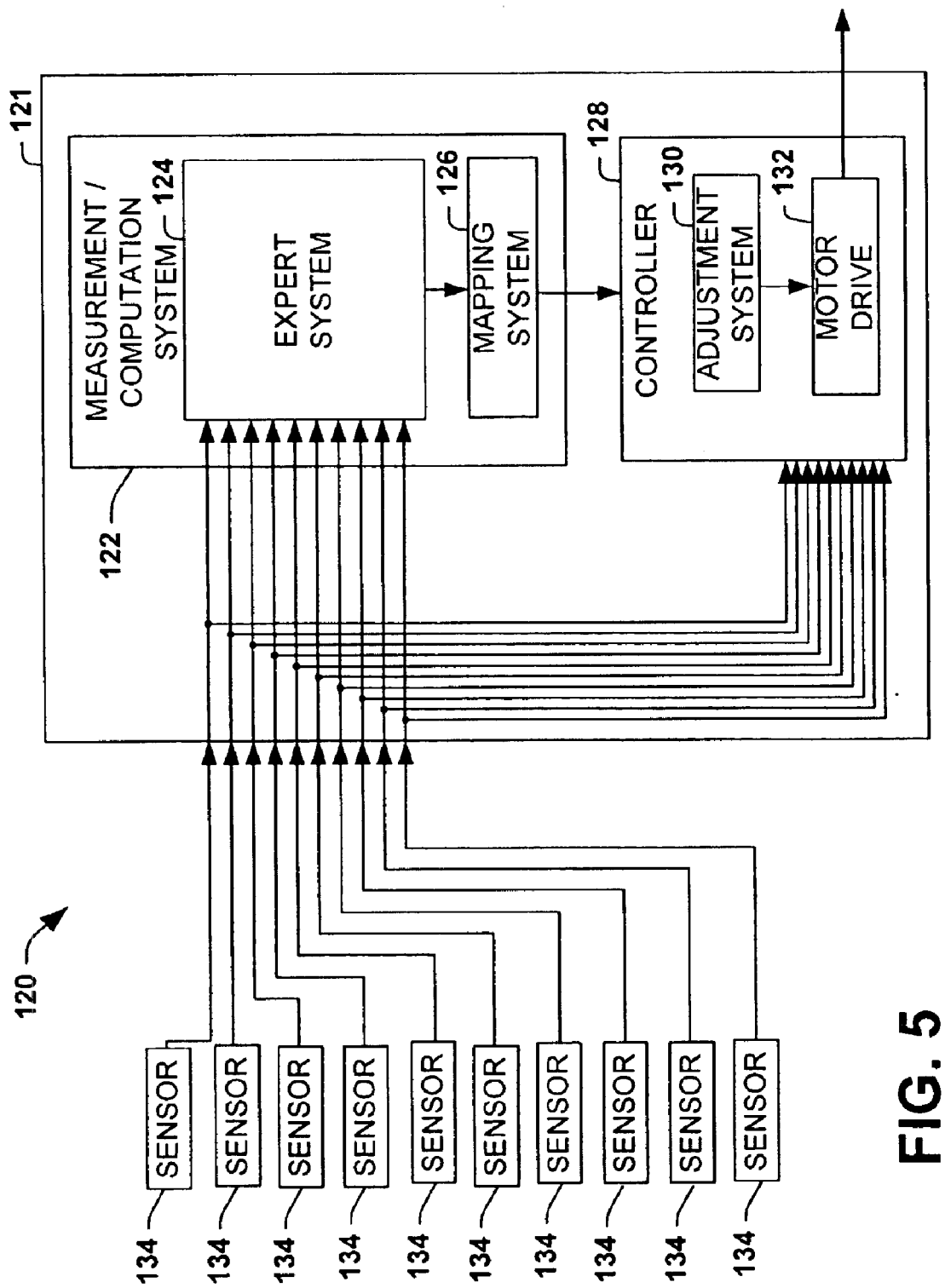
FIG. 5 illustrates a block schematic diagram of an error compensation system employing an expert system in accordance with an aspect of the present invention.

FIGS. 4–5 illustrate systems employing nonlinear training systems/methodologies, for example, back-propagation, Baysian, Fuzzy Set, Non Linear regression, or other neural network paradigms including mixture of experts, cerebellar model arithmetic computer (CMACS), Radial Basis Functions, directed search networks, and functional link nets. The training systems measure error pattern information from a linear motion system and providing prognostic information to a controller to facilitate controlling the linear motor system. With regards to the prognostic information, the controller can dynamically control/alter an input drive signal to the linear motion system to facilitate precise positioning and constant velocity of a linear motor along a track system. Thus, for example, if the prognostic information indicates that a future state of the linear motor may experience a low or high torque condition at a particular position, the controller can take affirmative measures to address the anticipated low or high torque condition. Thus, the prognostic data can be employed to mitigate, eliminate, or even avoid an undesirable operating condition of a linear motion system.

FIG. 4 illustrates a compensation system 100 for measuring error conditions associated with a linear motion system and for providing an adjusted input drive signal based on the measured error conditions. The system 100 includes a compensation module 101 having a measurement system 102 coupled to a one or more sensors 114 for measuring errors (e.g., cogging, ripple) associated with a linear motion system. The compensation module 101 also includes a controller 108 coupled to the measurement system 102. The controller 108 utilizes measurement information from the measurement system 102 to adjust an input drive signal provided by the controller 108 for driving a linear motor along a track of a linear motion system. It is to be appreciated that the functionality of the compensation module 101 can be employed in one or more devices or provided as algorithms part of a controller. Furthermore, the functionality associated with the compensation module 101 can be provided utilizing hardware, software or a combination of hardware and software.

The measurement system 100 includes a neural network 104 and a mapping system 106. A neural network or better known as an Artificial Neural Network (ANN) are a set of algorithms or processing steps that can be used to impart the capabilities such as generalization and pattern recognition to a standard computer system. These algorithms can learn to recognize patterns or classify data sets. The neural network 104 is provided with a set of input patterns from the one or more sensors 114 and provides a set of output patterns to the mapping system 106. The neural network 104 learns by changing its internal parameters in such a way that it produces the corresponding designated output pattern for a given input pattern. The output pattern is provided to the mapping system 106 which collects all of the signals from the neural network 104 and associates parameters with the errors.

The parameters can then be mapped or aggregated into a single error parameter (e.g., equation) and provided to an adjustment system 110 residing on the controller 108. The adjustment system 110 utilizes the aggregated error parameter to determine a correction factor (e.g., correction signal or correction instruction). The correction signal or instruction is then provided to a motor drive 112, which employs the correction signal or instruction to adjust the input drive signal to correct or inversely compensate for harmonics associated or induced into the drive input signal due to the one or more errors of the linear motion system.

FIG. 5 illustrates an alternate error compensation system 120 for measuring error conditions associated with a linear motion system and for providing an adjusted input drive signal based on the measured error conditions. The system 120 includes a compensation module 121 having a measurement system 122 coupled to a one or more sensors 134 for measuring errors (e.g., cogging errors, ripple errors) associated with a linear motion system. The compensation module 121 also includes a controller 128 coupled to the measurement system 122. The controller 128 utilizes measurement information from the measurement system 122 to adjust an input drive signal provided by the controller 128 for driving a linear motor along a track of a linear motion system. It is to be appreciated that the functionality of the compensation module 121 can be employed in one or more devices or provided as algorithms part of a controller. Furthermore, the functionality associated with the compensation module 121 can be provided utilizing hardware, software or a combination of hardware and software.

The measurement system 120 includes an expert system 124 and a mapping system 126. The expert system 124 includes a number of fuzzy expert rules (e.g., plurality of IF-THEN statement) for providing a set of learned outputs based on a set of error inputs provided by the one or more sensors 134. The expert system 124 learns by changing its internal parameters in such a way that it produces the corresponding designated output pattern for a given input pattern. The output pattern is provided to the mapping system 126 which collects all of the signals from the expert system 124 and associates parameters with the errors.

The parameters can then be mapped or aggregated into a single error parameter (e.g., equation) and provided to an adjustment system 130 residing on the controller 128. The adjustment system 130 utilizes the aggregated error parameter to determine a correction signal or instruction. The correction signal or instruction is then provided to a motor drive 132, which employs the correction signal or instruction to adjust the input drive signal to correct or inversely compensate for harmonics associated or induced into the drive input signal due to the one or more errors of the linear motion system.

Figure 6:
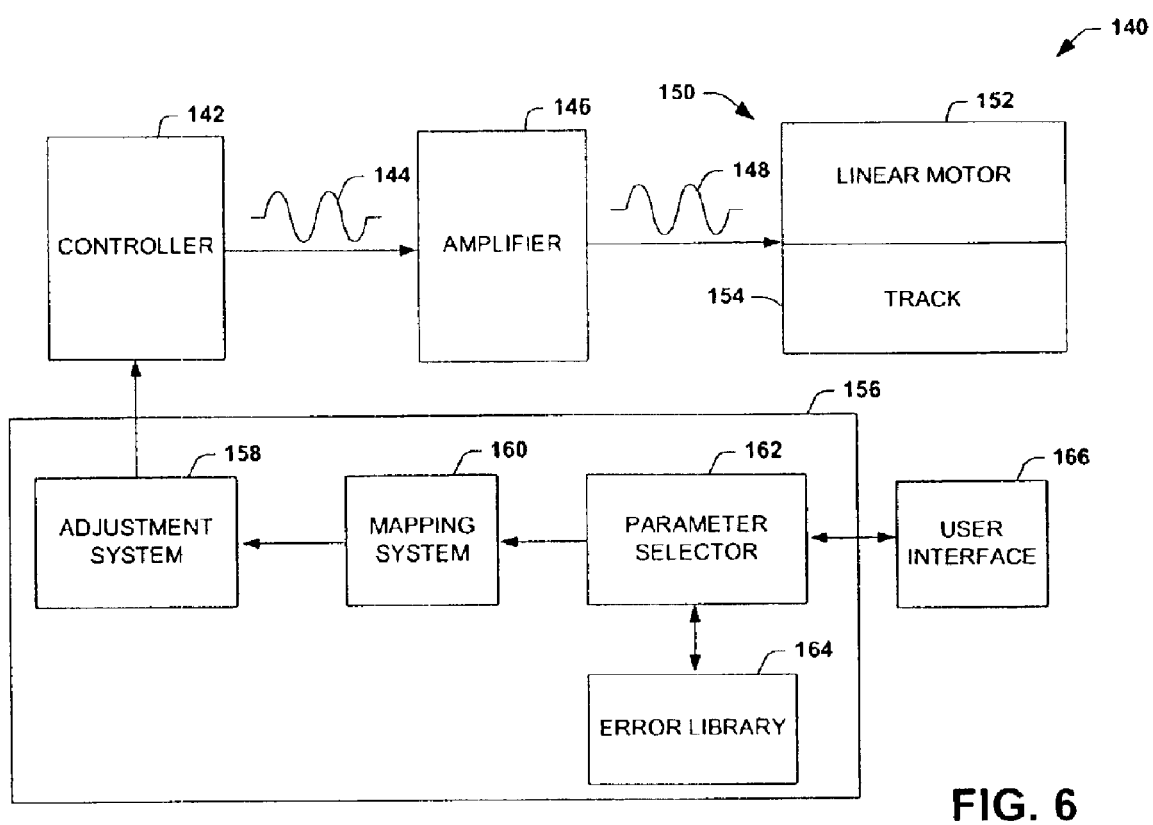
FIG. 6 illustrates a block schematic diagram of a linear motion system employing an error library in accordance with an aspect of the present invention.

FIG. 6 illustrates a linear motion system 140 in accordance with another aspect of the present invention. The linear motion system 140 utilizes norms and standards of well known errors associated with cogging and ripple errors of standard linear motors and linear motion systems. For example, certain linear motor types, motor coils and linear motions systems have known error types associated with them. The present invention provides an error library containing known error types and error corrections factors that can be provided by a user selecting parameters associated with one or more of the linear motor type, motor coils and linear motions systems being employed. Although this implementation of the present invention does not provide for real-time measurement and feedback of errors associated with the linear motion system, it can provide correction for 85–90% standard errors associated with a given linear motion system.

The linear motion system 140 includes a controller 142 coupled to an amplifier 146. The controller 142 and the amplifier 146 cooperate to control and drive a linear motor 152 along a track 154 in a linear motion system 150. The controller 142 provides a drive signal 144 to the amplifier 146, which amplifies the drive signal 144 and provides an amplified drive signal 148 to the linear motion system 150. The drive signal 148 controls the movement of the linear motor 152 along the track 154 for precise positioning of the linear motor at controlled positions along the track.

The linear motion system 140 uses one or more selected error coefficients (e.g., weighted) associated with the linear motion system, maps these error coefficients into parameters, and utilizes these parameters to correct for harmonic distortions (e.g., 1st, 2nd, 3rd) in the input signal. The linear motion system 140 substantially eliminates the harmonic distortion by inversely correcting the input signal based on the measured and mapped out errors. The linear motion system errors can be of a single occurrence type (e.g., one location along a given path) and of a repeating type (e.g., every time a linear motor passes over a magnet or coil).

A correction module 156 includes a parameter selector 162 coupled to an error library 164. The error library 164 includes a number of selectable error parameters (e.g., cogging errors, ripple errors) based on norms and standards relating to device types employed in linear motions systems and/or linear motors or characteristics associated with device types. It is to be appreciated that the correction module 156 can be a stand-alone module or the functionality be integrated into algorithms on a computer system as illustrated in FIG. 2. A user interface 166 is provided that allows a user to select one or more characteristics associated with the linear motion system 140 via the parameter selector 162. For example, a user can select a particular linear motor type, motor coils, motor track type and/or physical dimensions relating to any of the linear motor type, motor coils or motor track type being employed in the system. One or more error parameters are associated with a given device type or device type characteristic.

Once the selections are complete, the one or more correction parameters or coefficients (e.g., weighted) are provided to a mapping system 160. The mapping system 160 collects all of the parameters or coefficients and aggregates them into a single error parameter (e.g., equation) and provides the information to an adjustment system 158. The adjustment system 158 utilizes the aggregated error parameter to determine a correction signal or instruction. The correction signal or instruction is then provided to the controller 142, which employs the correction signal or instruction to adjust the input signal 144 to correct or inversely compensate for harmonics (e.g., first, second, third) associated or induced into the drive input signal 148 due to the one or more errors of the linear motion system 140.

Figure 7:
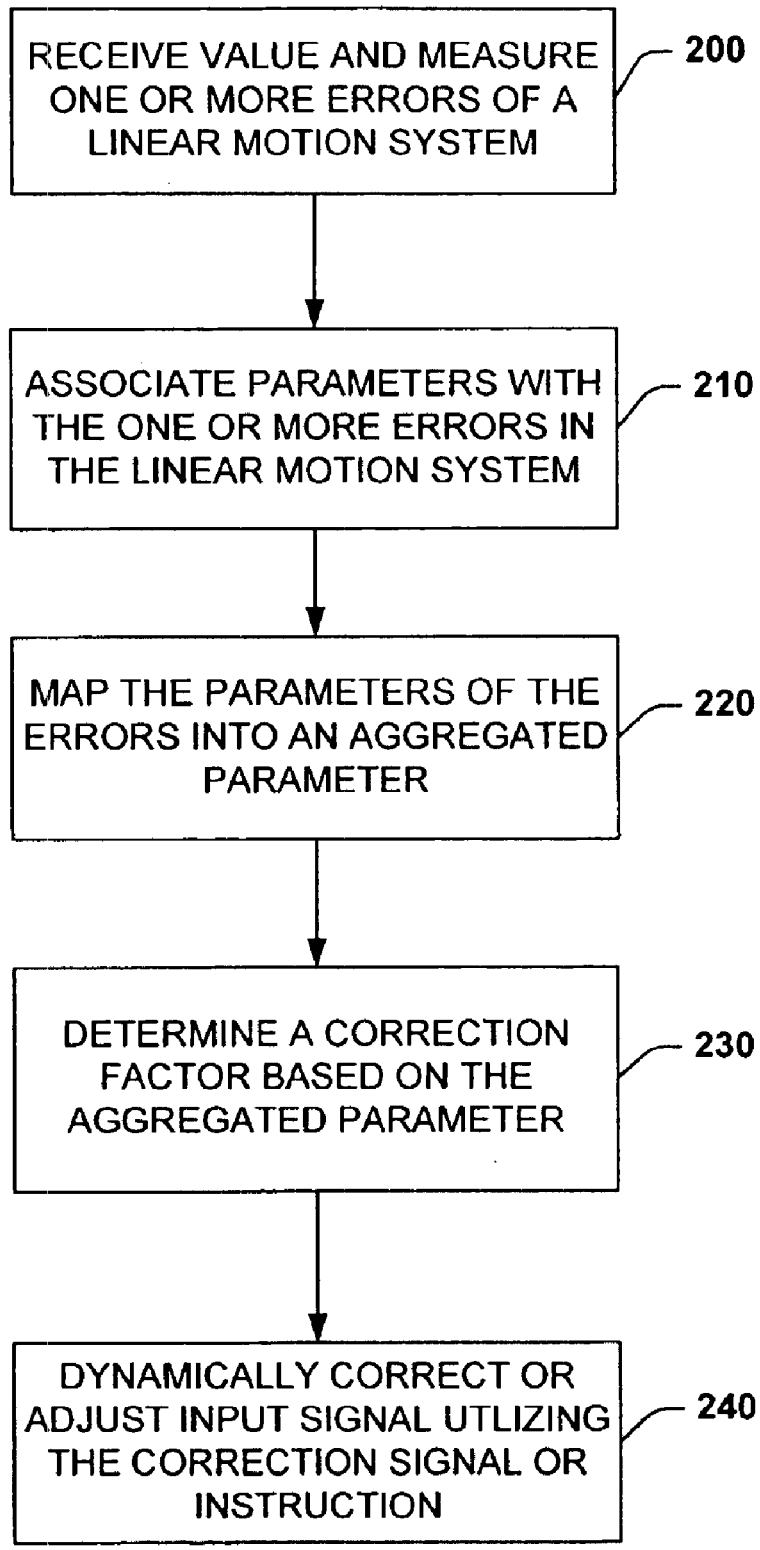
FIG. 7 illustrates a flow diagram of a methodology for compensating for errors associated with a linear motion system in accordance with an aspect of the present invention.
Figure 8:
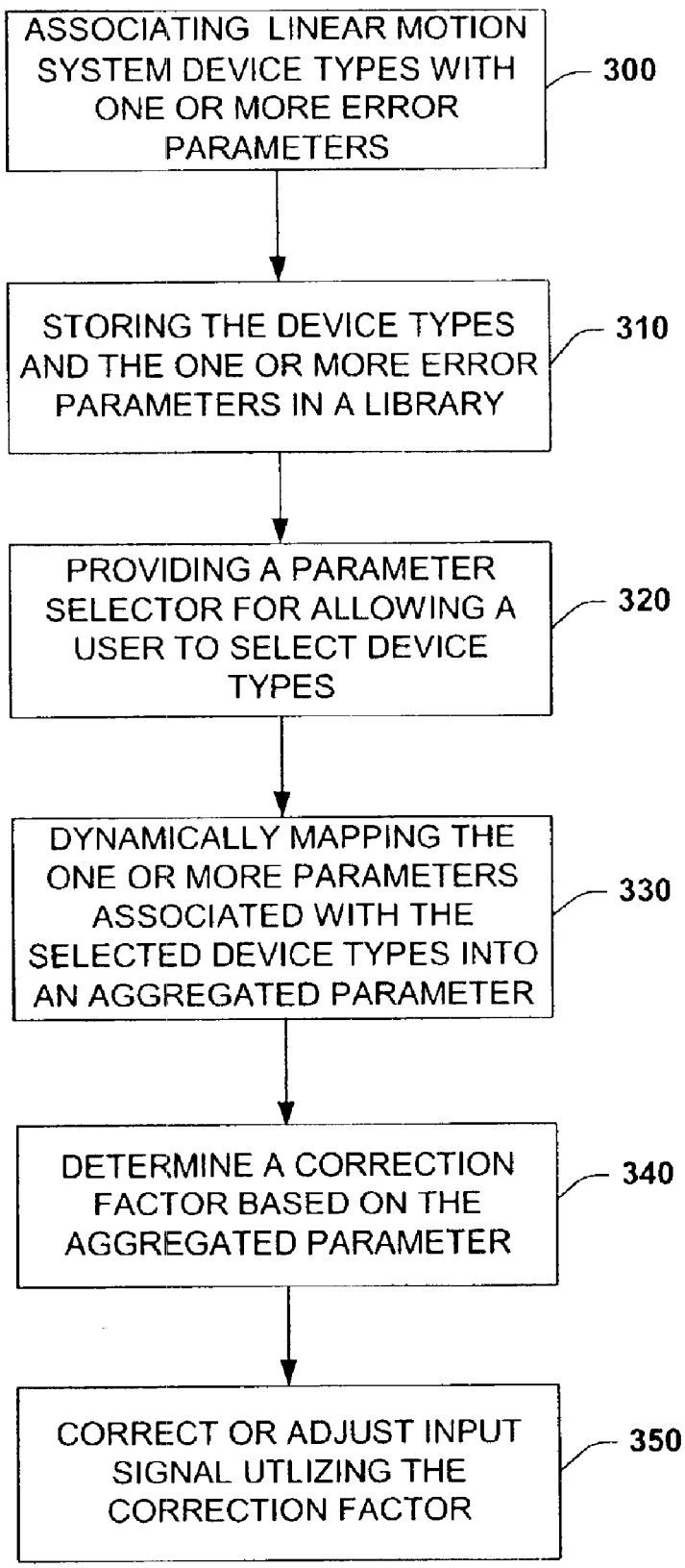
FIG. 8 illustrates a flow diagram of a methodology for compensating for errors associated with a linear motion system in accordance with another aspect of the present invention.

In view of the foregoing structural and functional features described above, methodologies in accordance with various aspects of the present invention will be better appreciated with reference to FIGS. 7–8. While, for purposes of simplicity of explanation, the methodologies of FIGS. 7–8 are shown and described as executing serially, it is to be understood and appreciated that the present invention is not limited by the illustrated order, as some aspects could, in accordance with the present invention, occur in different orders and/or concurrently with other aspects from that shown and described herein. Moreover, not all illustrated features may be required to implement a methodology in accordance with an aspect the present invention.

FIG. 7 illustrates one particular methodology for compensating for errors in a linear motion system in accordance with one particular aspect of the present invention. The methodology begins at 200 where one or more errors of a linear motion system are measured. The errors can be measured, for example, by sensors employed at different locations of the linear motion system and transmitting signals indicated of the errors to a measurement system. At 210, parameters are associated with the one or more errors in the linear motion system. The parameters are then mapped into an aggregated parameter at 220. The errors can be mapped employing a mapping system or mapping algorithm that provides weighted coefficients or the like for each error so that an aggregated parameter result is provided. At 230, a correction factor (e.g., correction signal or correction instruction) is determined based on the aggregated parameter. The correction signal or instruction can be determined by a correction or an adjustment system. Alternatively, a correction or adjustment algorithm can be employed.

At 240, the input signal is dynamically corrected or adjusted using the correction signal or instruction. For example, the correction signal can be mixed with the input signal using a mixer or the like to eliminate harmonics associated with errors in the linear motion system. Alternatively, the instruction can be provided to a controller that adjusts the input signal based on the instruction to eliminate harmonics associated with errors in the linear motion system. The methodology of 200–240 repeats during operation of the linear motion system such that the inputs signal is dynamically adjusted in real-time.

FIG. 8 illustrates another particular methodology for compensating for errors in a linear motion system in accordance with one particular aspect of the present invention. The method begins at 300 where linear motion system device type characteristics are associated with one or more error coefficients or parameters. For example, the one or more error coefficients or parameters can include parameters relating to cogging and ripple errors. Cogging errors are a form of magnetic detenting that occurs when a coil's steel laminations cross the alternating poles of the motor's rare-earth magnets. Cogging is typically negligible in non-ferrous motors, however, cogging in steel core motors is typically about 5% of the motor's continuous force rating. Ripple relates to all of the other errors associated with a linear motion system that cause a back EMF effect on the input drive signal.

At 310, a database is created that includes a number of linear motion device types and the one or more error coefficient or parameters associated with the number of linear motion device types. The linear motion device types and the one or more error coefficients or parameters can be stored in a library. At 320, a parameter selector is provided for allowing a user to select device types. At 330, one or more error parameters associated with the selected device types are dynamically mapped into an aggregated parameter. At 340, a correction factor (e.g., correction signal or correction instruction) is determined based on the aggregated parameter. The correction signal or instruction can be determined by a correction or adjustment system. Alternatively, a correction or adjustment algorithm can be employed. At 350, the input signal is corrected or adjusted using the correction signal or instruction. For example, the correction signal can be mixed with the input signal using a mixer or the like to eliminate harmonics associated with errors in the linear motion system. Alternatively, the instruction can be provided to a controller that continually adjusts the signal based on the received instruction.

Figure 9:
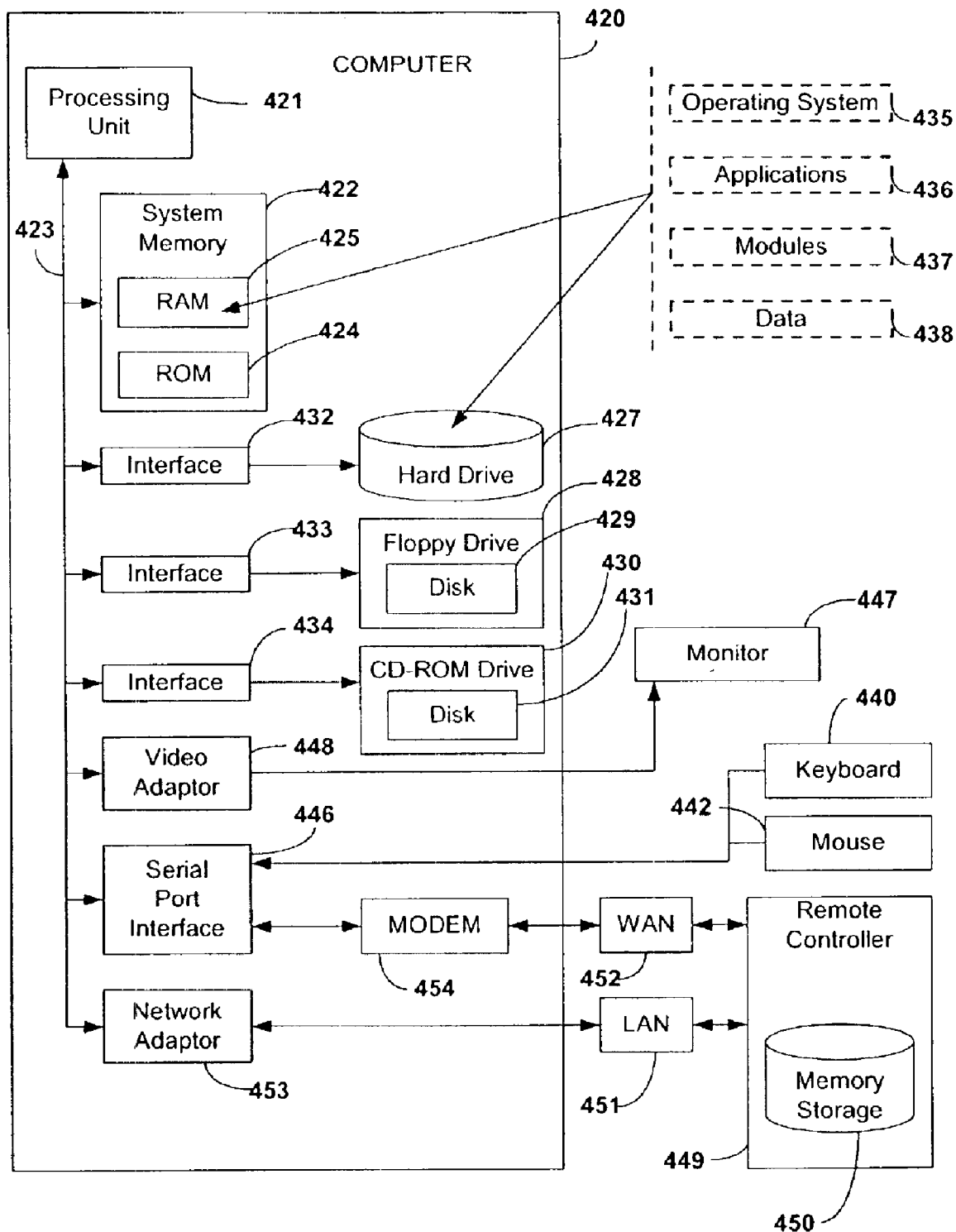
FIG. 9 illustrates a block diagram of a computer system in accordance with an environment of the present invention.

It is to be appreciated that at least a portion of the present invention can be employed using software algorithms. With reference to FIG. 9, an exemplary system for implementing the invention includes a conventional personal or server computer 420, including a processing unit 421, a system memory 422, and a system bus 423 that couples various system components including the system memory to the processing unit 421. The processing unit may be any of various commercially available processors, including Intel x86, Pentium and compatible microprocessors from Intel and others, including Cyrix, AMD and Nexgen; Alpha from Digital; MIPS from MIPS Technology, NEC, IDT, Siemens, and others; and the PowerPC from IBM and Motorola. Dual microprocessors and other multi-processor architectures also can be used as the processing unit 421.

The system bus may be any of several types of bus structure including a memory bus or memory controller, a peripheral bus, and a local bus using any of a variety of conventional bus architectures such as PCI, VESA, Microchannel, ISA and EISA, to name a few. The system memory includes read only memory (ROM) 424 and random access memory (RAM) 425. A basic input/output system (BIOS), containing the basic routines that help to transfer information between elements within the computer 420, such as during start-up, is stored in ROM 424.

The computer 420 further includes a hard disk drive 427, a magnetic disk drive 428, e.g., to read from or write to a removable disk 429, and an optical disk drive 430, e.g., for reading a CD-ROM disk 431 or to read from or write to other optical media. The hard disk drive 427, magnetic disk drive 428, and optical disk drive 430 are connected to the system bus 423 by a hard disk drive interface 432, a magnetic disk drive interface 433, and an optical drive interface 434, respectively. The drives and their associated computer-readable media provide nonvolatile storage of data, data structures, computer-executable instructions, etc. for the server computer 420. Although the description of computer-readable media above refers to a hard disk, a removable magnetic disk and a CD, it should be appreciated by those skilled in the art that other types of media which are readable by a computer, such as magnetic cassettes, flash memory cards, digital video disks, Bernoulli cartridges, and the like, may also be used in the exemplary operating environment.

A number of program modules may be stored in the drives and RAM 425, including an operating system 435, one or more application programs 436, other program modules 437, and program data 438. A user may enter commands and information into the computer 420 through a keyboard 440 and pointing device, such as a mouse 442. Other input devices (not shown) may include a microphone, joystick, game pad, satellite dish, scanner, or the like. These and other input devices are often connected to the processing unit 421 through a serial port interface 246 that is coupled to the system bus, but may be connected by other interfaces, such as a parallel port, game port or a universal serial bus (USB). A monitor 247 or other type of display device is also connected to the system bus 423 via an interface, such as a video adapter 448. In addition to the monitor, computers typically include other peripheral output devices (not shown), such as speakers and printers.

The computer 420 may operate in a networked environment using logical connections to one or more remote PLCs, such as a remote PLC 449. Alternatively, the remove PLC 449 may be coupled to a workstation, a server computer, a router, a peer device or other common network node remote device. This remote device can include many or all of the elements described relative to the computer 420, although only a memory storage device 450 has been illustrated in FIG. 9. The logical connections depicted in FIG. 9 include a local area network (LAN) 451 and a wide area network (WAN) 452. Such networking environments are commonplace in offices, enterprise-wide computer networks, intranets and the Internet.

When used in a LAN networking environment, the computer 420 is connected to the local network 451 through a network interface or adapter 453. When used in a WAN networking environment, the server computer 420 typically includes a modem 454, or is connected to a communications server on the LAN, or has other means for establishing communications over the wide area network 452, such as the Internet. The modem 454, which may be internal or external, is connected to the system bus 423 via the serial port interface 446. In a networked environment, program modules depicted relative to the computer 420, or portions thereof, may be stored in the remote memory storage device. It will be appreciated that the network connections shown are exemplary and other means of establishing a communications link between the computers may be used.

In accordance with practices of persons skilled in the art of computer programming, the present invention is described below with reference to acts and symbolic representations of operations that are performed by the computer 420, unless indicated otherwise. Such acts and operations are sometimes referred to as being computer-executed. It will be appreciated that the acts and symbolically represented operations include the manipulation by the processing unit 421 of electrical signals representing data bits which causes a resulting transformation or reduction of the electrical signal representation, and the maintenance of data bits at memory locations in the memory system (including the system memory 422, hard drive 427, floppy disks 429, and CD-ROM 431) to thereby reconfigure or otherwise alter the computer system's operation, as well as other processing of signals. The memory locations where data bits are maintained are physical locations that have particular electrical, magnetic, or optical properties corresponding to the data bits.

The invention has been described with reference to various aspects of the present invention. Obviously, modifications and alterations will occur to others upon reading and understanding the foregone detailed description. It is intended that the invention be construed as including all such modifications alterations, and equivalents thereof.

What is claimed is:

1. A linear motion system comprising:
   a linear motor that receives at least one signal from at least one of an amplifier and controller;
   a measurement component that measures two or more errors associated with a linear motion system;
   a mapping system that maps the two or more errors into two or more parameters and aggregates the two or more parameters into an aggregated parameter; and
   a correction system that alters an input signal based at least in part upon the aggregated parameter to compensate for the two or more errors.

2. The system of claim 1, the correction system provides a correction signal to a controller to compensate for the two or more errors, the controller adjusts the input drive signal based on the correction signal.

3. The system of claim 1, the correction system provides a correction instruction to a controller to compensate for the two or more errors, the controller adjusts the input drive signal based on the correction instruction.

4. The system of claim 1, the two or more errors comprising at least one of cogging and ripple errors.

5. The system of claim 1, the linear motion system having a linear motor that moves along a track and at least one sensor that measures the two or more errors, the at least one sensor being positioned on one of the at least linear motor and track.

6. The system of claim 1, the input drive signal being provided by one of a controller and an amplifier.

7. The system of claim 1, the measurement system further comprising a neural network operative to measure the two or more errors and provide a designated output pattern to the correction system.

8. The system of claim 1, the measurement system further comprising an expert system operative to measure the two or more errors and provide a designated output pattern to the correction system.

9. The system of claim 1, the measurement system operative to measure two or more errors from an amplifier, the two or more errors comprising a mismatch of input signals from a controller and the amplifier.

10. The system of claim 1, the two or more errors relating to back electromagnetic forces that cause harmonic distortion in the input drive signal.

11. A system that compensates for errors in a linear motion system, the system comprising:
    an error library containing a plurality of device type characteristics and two or more error coefficients associated with the plurality of device type characteristics;
    a parameter selector operative to allow a user to select two or more device type characteristics and automatically associate two or more error coefficients with the selected device type characteristics; and an adjustment system that adjusts an input signal to compensate for two or more errors of a linear motion system using the two or more error coefficients.

12. The system of claim 11, further comprising a mapping system that maps the two or more error coefficients into two or more error parameters and aggregates the two or more error parameters into a single aggregated parameter, the adjustment system utilizes the single aggregated parameter to compensate for the two or more errors.

13. The system of claim 11, being implemented as a stand-alone module.

14. The system of claim 11, further comprising a user interface coupled to the parameter selector for allowing a user to select device type characteristics.

15. The system of claim 11, the two or more error coefficients being related to at least one of cogging and ripple errors.

16. A computer-readable medium having computer executable instructions for performing a method of compensating for errors associated with a linear motion system, the method comprising:

mapping at least two errors relating to a linear motion system into a single aggregated parameter;

placing the errors and their matching parameter into an error library; and modifying an input drive signal to compensate for the at least two errors utilizing the aggregated parameter.

17. The computer readable medium of claim 16, the at least two errors being received from a measurement system coupled to at least one sensor on a linear motion system.

18. The computer readable medium of claim 16, the at least two errors being received from an error library containing a plurality of selectable device type characteristics and one or more errors associated with the device type characteristics.

19. A compensation module for compensating for errors in a linear motion system, the compensation module comprising:

a measurement system that measures two or more errors associated with a linear motion system;

a correction system that provides an aggregated parameter relative to the two or more errors; and a controller operative to correct an input signal to compensate for the two or more errors using the aggregated parameter.

20. The module of claim 19, further comprising a mapping system that maps the two or more errors into two or more parameters and aggregates the two or more parameters into a single aggregated parameter.

21. The module of claim 19, further comprising an adjustment system that provides a correction signal utilizing the aggregated parameter, the controller adjusts the input drive signal based on the correction signal.

22. The module of claim 19, the measurement system further comprising a neural network operative to measure the two or more errors and provide a designated output pattern to the controller.

23. The module of claim 19, the measurement system further comprising an expert system operative to measure the two or more errors and provide a designated output pattern to the controller.

24. A method for compensating for errors in a linear motion system, the system comprising:

measuring two or more errors associated with a linear motion system;

mapping the two or more errors into an aggregated parameter; and adjusting an input drive signal based on the aggregated parameter.

25. The method of claim 24, further comprising associating parameters with the two more errors.

26. Tho method of claim 24, further comprising determining a correction factor based on the aggregated parameter, the correction factor being utilized to dynamically adjust the input drive signal.

27. A method for compensating for errors in a linear motion system, the method comprising:

associating linear motion system device type characteristics with one or more error parameters;

storing the device type characteristics and the one or more error parameters in an error library; and providing a device type characteristic selector to allow a user to select device type characteristics.

28. The method of claim 27, further comprising dynamically mapping the two or more parameters into an aggregated parameter.

29. The method of claim 27, further comprising determining a correction factor based on an aggregated parameter, the correction factor being utilized to dynamically adjust an input drive signal of a linear motion system.

30. A system for compensating for errors in a linear motion system, the system comprising:

means for determining two or more errors associated with a linear motion system;

means for mapping the two or more errors into a single aggregated parameter; and means for modifying an input drive signal of the linear motion system utilizing the single aggregated parameter to compensate for the two or more errors.

31. A linear motion system comprising:

a measurement system that receives at least one signal from at least one of an amplifier and controller, wherein the measurement system is operative to measure one or more errors from an amplifier, the one or more errors comprising a mismatch of input signals from a controller and the amplifier;

a measurement/computational component that measures two or more errors associated with a linear motion system; and a correction system that facilitates adjustment of an input signal based at least in part upon the two or more errors.

* * * * *